Oct. 22, 1963 L. C. MILLER 3,107,562
TOOL HEAD WITH REMOVABLE TOOL HOLDER
Original Filed July 11, 1955 3 Sheets-Sheet 1
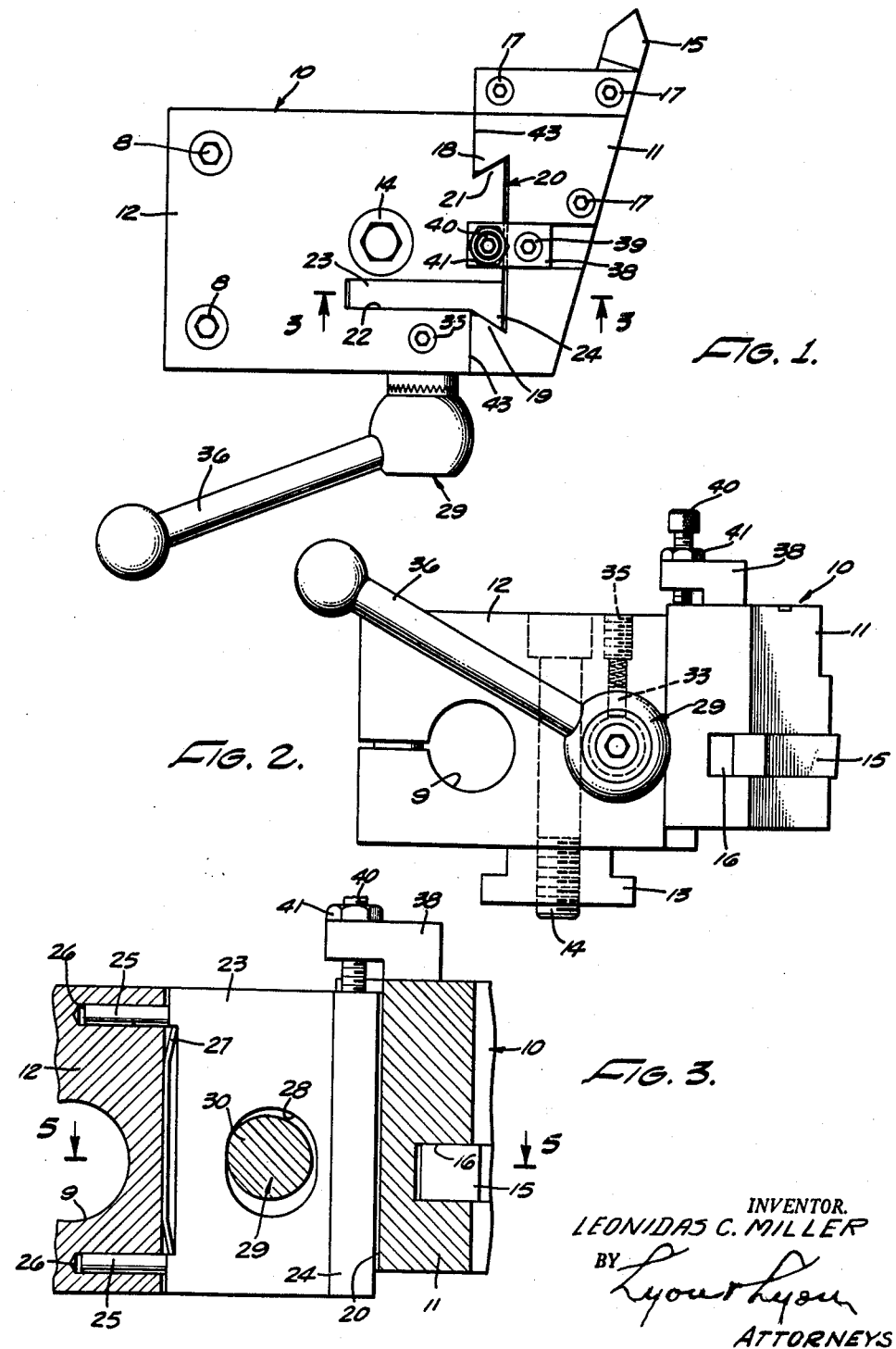
INVENTOR.
LEONIDAS C. MILLER
BY
ATTORNEYS Oct. 22, 1963 L. C. MILLER 3,107,562
TOOL HEAD WITH REMOVABLE TOOL HOLDER
Original Filed July 11, 1955 3 Sheets-Sheet 2

INVENTOR.
LEONIDAS C. MILLER
BY
ATTORNEYS

Oct. 22, 1963    L. C. MILLER    3,107,562
TOOL HEAD WITH REMOVABLE TOOL HOLDER
Original Filed July 11, 1955    3 Sheets-Sheet 3

INVENTOR.
LEONIDAS C. MILLER
BY
ATTORNEYS

United States Patent Office 3,107,562
Patented Oct. 22, 1963

3,107,562
TOOL HEAD WITH REMOVABLE TOOL HOLDER
Leonidas C. Miller, Los Angeles, Calif., assignor to Lloyd W. Kuhn, Los Angeles, Calif.
Continuation of applications Ser. No. 765,425, Oct. 6, 1958, and Ser. No. 521,128, July 11, 1955. This application Jan. 7, 1963, Ser. No. 249,691
2 Claims. (Cl. 82—36)

This invention relates to a novel tool head assembly which is adapted to be mounted on the cross-slide of a lathe, or the like. The cutting tool is releasably mounted on a tool holder, and the tool holder is in turn detachably mounted on the tool head. I refer to the tool head and tool holder when assembled together as the tool head assembly. The tool holder may be easily and quickly secured in position on the tool head and removed therefrom, thus enabling the mechanic to rapidly and easily change or replace interchangeable tool holders, as occasion may require.

An object of my invention is to provide a novel tool head assembly of exceptional rigidity in which the tool holder is held and locked firmly in the desired position on the tool head by means of a gib plate on one member engaging a mating surface on the other member.

Another object of my invention is to provide a novel tool head having movable locking means into which a novel tool holder may be removably secured.

Another object of my invention is to provide a novel tool head provided with a movable locking means into which a tool holder may be removably secured and having adjusting means carried thereon cooperating with the tool head whereby the tool holder may be adjusted relative to the tool head.

An important feature of my invention is to provide a novel form of detachable connection between the tool head and removable tool holder, the parts when secured, forming a unitary solid metal structure of maximum rigidity.

Other and more detailed objects and advantages will appear hereinafter in connection with the drawings and the following description thereof:

FIGURE 1 is a top plan view of a tool head assembly embodying my invention.

FIGURE 2 is a side elevation thereof.

FIGURE 3 is a sectional elevation taken substantially on lines 3—3 as shown on FIGURE 1, the movable locking element being shown in full lines and in locked position.

Figure 4:
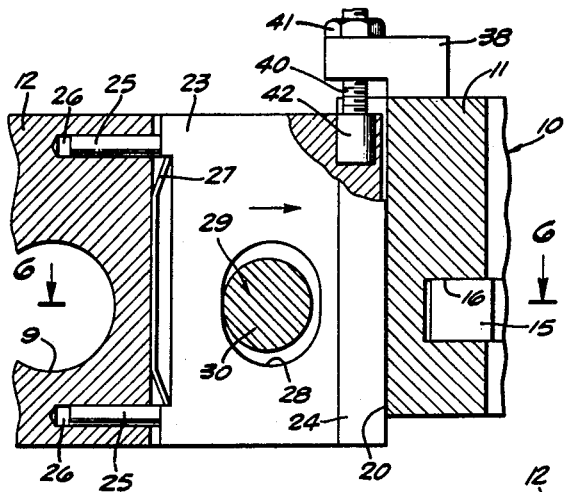
FIGURE 4 is a view similar to FIGURE 3, the movable locking element being shown in release position.
Figure 5:
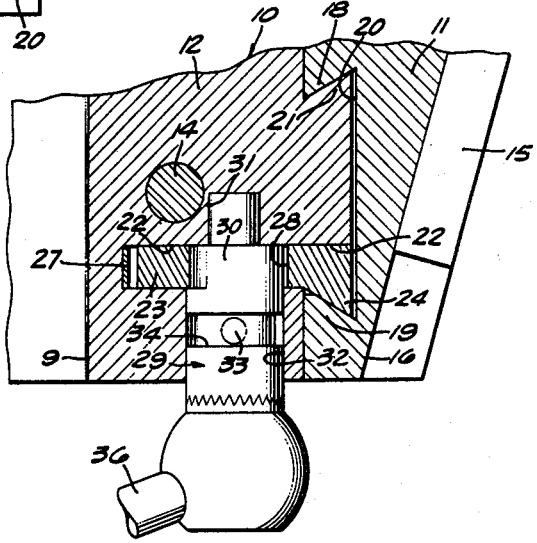
FIGURE 5 is a sectional plan view taken substantially on lines 5—5 as shown in FIGURE 3, the locking element being shown in locked position.

This application is a continuation of my copending application Serial No. 765,425, filed October 6, 1958, now abandoned, which application was itself a continuation of Serial No. 521,128, filed July 11, 1955 now abandoned, which application was itself a continuation-in-part of Serial No. 210,711, filed February 13, 1951, and now abandoned.

Referring to the drawings, the tool head assembly generally designated 10 includes the tool head or support member 12 and the detachable tool holder member 11. The assembly 10 is adapted to be mounted upon the cross-slide of a lathe, or it may be used with a drill press or shaper or other machine tool, if desired. The T-shaped nut 13 is engaged by the hollow hex head bolt 14 and serves to clamp the tool head 12 in position, as will be readily understood. The tool head may also be supported by employing the clamp screws 8 to clamp a support bar (not shown) within the opening 9.

The cutting tool 15 may take any suitable or desirable shape or form for cutting, threading, turning, boring, cut off, or other operation. This tool 15 is clamped in place on the holder 11 by conventional means, and as shown in the drawings this means comprises a side-opening slot 16 which receives the tool 15, and set screws 17 which clamp it in place.

In accordance with my invention, the holder 11 is provided with spaced inclined shoulders 18 and 19 defining a vertical dovetail groove 20 between them. These shoulders are carefully and accurately formed and are connected by the clearance wall 47. A single inclined abutment 21 is provided on the vertical dovetail projection 45 formed integrally upon the tool holder 11 and the abutment is accurately formed to have surface contact with the shoulder 18. A vertical milled slot 22 on the tool head 12 provides walls receiving the lock element 23 in close-fitting sliding relationship. This lock element has an enlarged projecting head at its forward end provided with an inclined abutment 24 having surface contact with the shoulder 19 on the tool holder 11.

The tool holder member 11 is provided with spaced co-planar faces 43 and 43a and the support member 12 is provided with similar spaced co-planar faces 44 and 44a. The faces 43 and 43a are adapted to engage the faces 44 and 44a respectively in surface contact.

The lock element 23 is guided for longitudinal movement on the tool head 12 by means of the integral guide pins 25 which are received in spaced parallel holes 26 provided in the tool head 12. A leaf spring 27 is positioned at the base of the milled slot 22 between the pins 25 and acts on the lock element 23. The action of spring 27 is to move the lock element 23 toward the right, as viewed in the various figures of the drawings.

The lock element 23 is provided with a guided portion 23a having a vertically elongated opening 28. Through this opening 28 projects a horizontal cam shaft 29 having a cam 30 formed integrally thereon. The inner end of the shaft is turnably mounted within the pilot bore 31 and the larger end of the shaft is turnably mounted within the coaxial bore 32. To prevent dis-assembly, a spring-urged pin 33 projects into a peripheral groove 34 formed in the shaft 29. The pin and its spring are held in place by a threaded plug 35. The shaft 29 projects laterally beyond the side boundary of the tool head 12. An actuating member or lever 36 is fixed to the projecting portion of the shaft for manually turning the cam shaft 29 in either direction.

Figure 6:
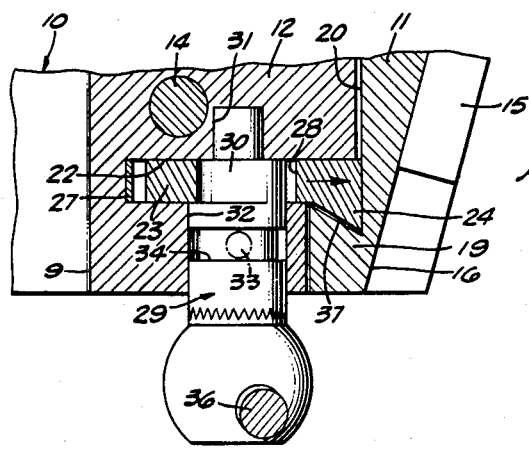
FIGURE 6 is a sectional plan view taken substantially on lines 6—6 as shown on FIGURE 4, the locking element being shown in release position.

When the lever 36 is moved to the position shown in FIGURE 6, the cam 30 allows the leaf spring 27 to move the lock element 23 toward the right, thereby forming clearance space 37 between the surfaces 19 and 24. The lock element 23 is thus in release position and the tool holder 11 can readily be removed by sliding it end-wise along the cooperating dovetail parts 20 and 45. Another holder 11 with identical dovetail shoulders 18, 19 and with the same or different form of tool bit may then be placed in position relative to the tool head 12 preparatory to clamping solidly in place. The lever 36 is then turned counterclockwise to the locking position shown in FIGURES 1 and 2. This action causes the cam 30 to engage the wall of the opening 28 and move the lock element 23 to the left against the action of the leaf spring 27. The abutments 24 and 21 engage in solid contact to seat inclined shoulders 18 and 19 in solid abutting contact respectively, and hence the holder 11 is rigidly supported upon the tool head 12, with the co-planar faces 43 and 43a and co-planar faces 44 and 44a in metal-to-metal surface contact. The parts 11 and 12 then function as a single rigid unit. Clearance space remains between the end wall 46 on the projection 45 and the clearance wall 47 which connects the inclined shoulders 18 and 19 on the tool holder member 11.

It will be noted that the lock element 23 is prevented from canting or tilting by the sliding engagement of its guided portion 23a within the milled slot 22 and by the action of the guide pins 25 in sockets 26. The slanted face 24 is therefore accurately positioned and guided.

Means are provided for adjusting the position of the holder 11 along the dovetail slot connection, prior to clamping solid. As shown in the drawings, this means may comprise a stop bracket 38 fixed to the holder 11 by means of threaded fastening element 39. A set screw 40 is threaded into this bracket and is provided with a lock nut 41. The lower end of the set screw 40 engages a hardened insert 42 on the tool head 12. This adjusting feature makes it possible to remove the tool holder 11 and replace it in exactly the same position. Different tool holders, each carrying a particular tool, may be thus interchangeably mounted on the tool head 12, each in pre-selected position.

Figure 7:
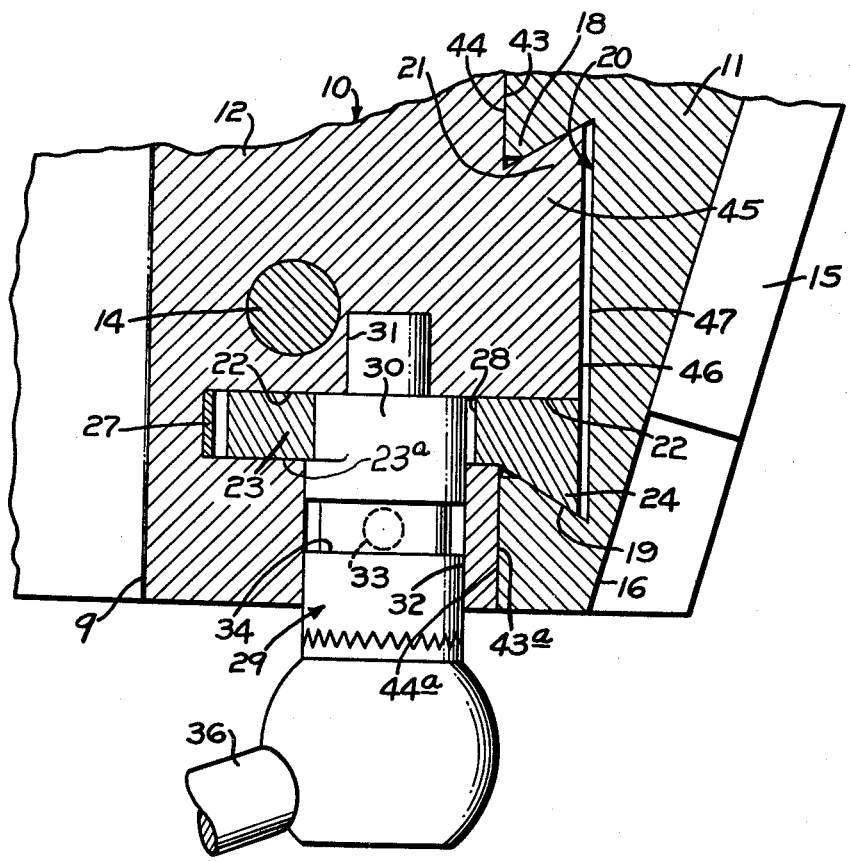
FIGURE 7 is a sectional view similar to FIGURE 5 but shown on an enlarged scale and in diagrammatic form.

FIGURE 7 shows the abutting co-planar faces 43, 43a, 44 and 44a and shows the dovetail connection parts positioned therebetween. These dovetail connection parts include the inclined shoulders 18 and 19 and the abutments 21 and 24 which engage them in surface contact. Clearance space is maintained between the end wall 46 on one member and the clearance wall 47 on the other. The spaced co-planar end faces on the support member and tool holder member are brought into surface engagement by means of cooperating inclined abutments and shoulders forming the dovetail connection parts and the clamping engagement is developed by the sliding block member moving in a direction normal to the co-planar abutting faces. This construction produces a particularly rigid connection because the face-to-face contact between the members is located outside the inclined contacting surfaces of the dovetail parts.

Having fully described my invention, it is to be understood that I am not to be limited to the details herein set forth but that my invention is of the full scope of the appended claims.

I claim:

1. In combination, a horizontal support member and a vertically movable tool holder member each having laterally spaced vertically extending contact faces, the contact faces being engageable in surface contact, co-operating parts on said members comprising a dovetail projection on said support member and a co-operating dovetail groove on said tool holder member receiving said projection, the projection and groove extending vertically and being interposed between said contact faces, said co-operating parts including laterally spaced inclined shoulders on said tool holder member connected by a clearance wall on that member, said co-operating parts also including an inclined abutment on said support member engageable with one of said inclined shoulders in surface contact, said support member having an end face spaced from said clearance wall, means on said support member defining a guide recess extending in a direction normal to said contact faces, a lock element having a guided portion slidably received within said guide recess for horizontal movement, said means preventing turning movement of said lock element about an axis extending in the direction of its movement relative to said support member, said lock element having an enlarged head projecting from said guided portion and engageable in surface contact with the other inclined shoulder, said lock element having an opening in said guided portion comprising a vertically elongated slot extending horizontally through said lock element, a horizontal cam shaft turnably mounted on said support member and extending through said elongated slot at right angles to the direction of movement of said lock element, co-operating means on said support member and said cam shaft preventing axial movement of said cam shaft, said cam shaft having a cam thereon positioned within said elongated slot for retracting said lock element upon turning movement of said cam shaft to bring said laterally spaced contact faces into solid abutting surface engagement and to leave clearance space between said end surface and said clearance wall, said cam shaft having a portion projecting laterally beyond a side face of said support member, and an actuating member secured to said projecting portion of said cam shaft.

2. The combination set forth in claim 1 in which said actuating member comprises a lever.

References Cited in the file of this patent

UNITED STATES PATENTS 2,187,854     Hallenbeck et al.          Jan. 23, 1940

FOREIGN PATENTS 353,507     Italy                  Oct. 19, 1937